United States Patent
Chen et al.

(10) Patent No.: US 11,028,308 B2
(45) Date of Patent: Jun. 8, 2021

(54) INVERT EMULSIFIERS FROM DCPD COPOLYMERS AND THEIR DERIVATIVES FOR DRILLING APPLICATIONS

(71) Applicant: M-I L.L.C., Houston, TX (US)

(72) Inventors: Yiyan Chen, Sugar Land, TX (US); Dimitri M. Khramov, Katy, TX (US); Glynda A. Addicks, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/817,865

(22) Filed: Nov. 20, 2017

(65) Prior Publication Data

US 2018/0142135 A1    May 24, 2018

Related U.S. Application Data

(60) Provisional application No. 62/425,357, filed on Nov. 22, 2016.

(51) Int. Cl.
   *C09K 8/36*   (2006.01)
   *E21B 21/00*  (2006.01)

(52) U.S. Cl.
   CPC .............. *C09K 8/36* (2013.01); *E21B 21/00* (2013.01)

(58) Field of Classification Search
   CPC ... C09K 8/54; C09K 8/24; C09K 8/44; C09K 8/805; C09K 8/32; C09K 8/502; C09K 8/536; C09K 8/605; C09K 2208/08; C09K 2208/12; C09K 2208/18; C09K 2208/20; C09K 2208/22; C09K 2208/28; C09K 2208/32; C09K 8/03; C09K 8/36; C09K 8/467; C09K 8/487; C09K 8/5045; C09K 8/508; C09K 8/516; C09K 8/524; C09K 8/528; C09K 8/602; C09K 8/604; C09K 8/70; E21B 33/1208; E21B 21/068; E21B 33/00; E21B 33/127; E21B 33/14; E21B 34/00; E21B 37/00; E21B 43/267; E21B 47/00; E21B 49/00; E21B 21/00
   See application file for complete search history.

(56) References Cited

U.S. PATENT DOCUMENTS

| | | | |
|---|---|---|---|
| 5,236,624 A * | 8/1993 | Lepert | C08J 3/03 366/14 |
| 5,437,331 A | 8/1995 | Gupta et al. | |
| 6,169,134 B1 * | 1/2001 | Jones | C09K 8/32 507/118 |
| 2008/0064612 A1 * | 3/2008 | Xiang | C09K 8/36 507/118 |
| 2015/0136402 A1 * | 5/2015 | Hurd | C09K 8/32 166/305.1 |
| 2016/0145483 A1 * | 5/2016 | Lecerf | C09K 8/426 166/308.2 |

FOREIGN PATENT DOCUMENTS

| | | | |
|---|---|---|---|
| WO | 2008/123888 A1 | | 10/2008 |
| WO | WO2008/123888 | * | 12/2008 |
| WO | 2009/009343 A2 | | 1/2009 |
| WO | WO2009/009343 | * | 1/2009 |

OTHER PUBLICATIONS

International Search Report and Written Opinion for the equivalent International patent application PCT/US2017/062848 dated Feb. 22, 2018.
International Preliminary Report on Patentability for the equivalent International patent application PCT/US2017/062848 dated Jun. 6, 2019.

\* cited by examiner

*Primary Examiner* — Kumar R Bhushan

(57) ABSTRACT

Wellbore fluids and methods of drilling with the wellbore fluids are provided. One wellbore fluid may include an oleaginous continuous phase, a non-oleaginous discontinuous phase, and a polymer having a polycyclic backbone. One method may include pumping the wellbore fluid into a wellbore through an earthen formation.

14 Claims, 3 Drawing Sheets

INVERT EMULSIFIERS FROM DCPD COPOLYMERS AND THEIR DERIVATIVES FOR DRILLING APPLICATIONS

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate. The drilling fluid should also form a thin, low permeability filter cake that seals openings in formations penetrated by the bit and act to reduce the unwanted influx of formation fluids from permeable rocks.

Drilling fluids are typically classified according to their base material; in oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Oil-based drilling fluids are generally used in the form of invert emulsion fluids. An invert emulsion mud may include three-phases: an oleaginous phase, a non-oleaginous phase and a finely divided particle phase. Optionally included are emulsifiers and emulsifier systems, weighting agents, fluid loss additives, alkalinity regulators and the like, for stabilizing the system as a whole and for establishing the desired performance properties.

Emulsifiers are routinely employed in the drilling business to lower the interfacial tension between oil and water which allows the formation of stable invert emulsion fluids/mud (IEF) with small drops to be formed. There have been many emulsifiers used in the drilling applications including but not limited to alkyl amine, alkyl amidoamine, and derivatives.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a wellbore fluid that includes an oleaginous continuous phase, a non-oleaginous discontinuous phase and a polymer having a polycyclic backbone.

In another aspect, embodiments of the present disclosure relate to a method of drilling that includes pumping a wellbore fluid into a wellbore through an earthen formation, the wellbore fluid including an oleaginous continuous phase, a non-oleaginous discontinuous phase and a polymer having a polycyclic backbone.

Other aspects and advantages of the claimed subject matter will be apparent from the following description and the appended claims.

DETAILED DESCRIPTION

Figure 1:
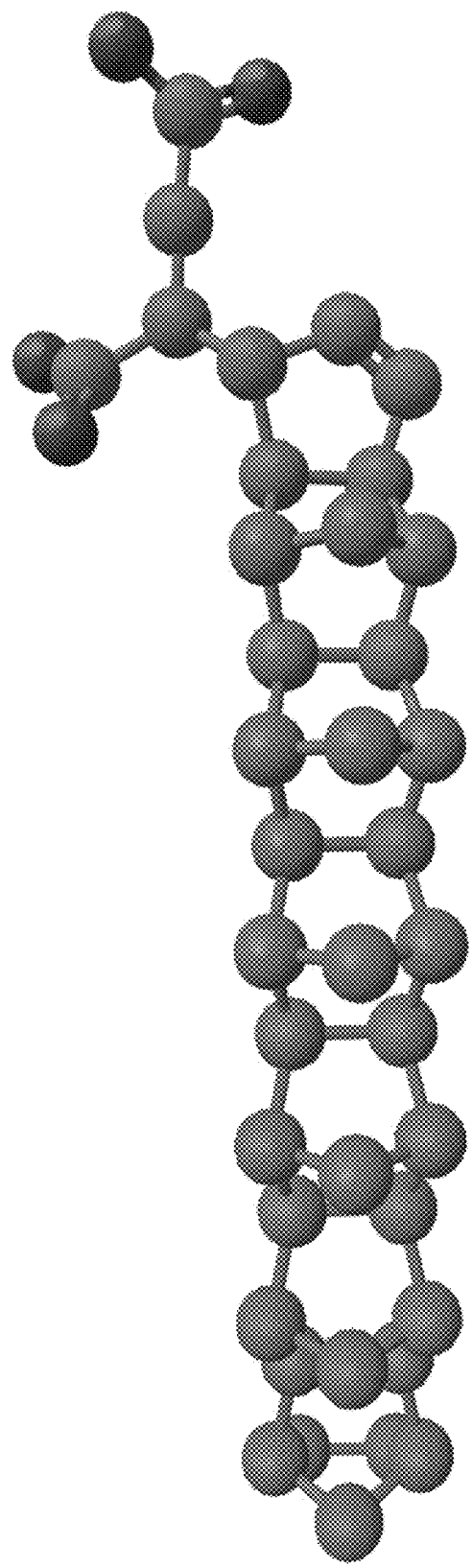
FIG. 1 shows the 3D structure of a polymer according to embodiments of the present disclosure.

Generally, embodiments disclosed herein are directed to emulsifiers that are used to stabilize emulsified wellbore fluids. More specifically, embodiments disclosed herein relate to wellbore fluids for downhole applications formed of an oleaginous continuous phase, a non-oleaginous discontinuous phase and a polymer having a polycyclic backbone. The inventors of the present disclosure have found that polymers having a polycyclic backbone may be incorporated as emulsifiers into a wellbore fluid to stabilize the non-oleaginus discontinuous phase within the oleaginous continuous phase, particularly at high temperatures.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

As noted above, the wellbore fluids of the present disclosure may be oil-based wellbore fluids, such as emulsions of oleaginous and non-oleaginous fluids. In particular, various embodiments of the present disclosure may provide for an invert emulsion wellbore fluid. Invert emulsion, as used herein, is an emulsion in which a non-oleaginous fluid is the discontinuous phase and an oleaginous fluid is the continuous phase. The non-oleaginous fluid (such as water) is dispersed in spherical form by violent agitation of a mixture of a non-oleaginous and an oleaginous fluid (such as an oil and water mixture) in the presence of an emulsifier.

Oleaginous liquid, as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

Non-oleaginous liquid as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these.

An emulsifier is a kind of surfactant. Surfactants are surface active compounds, that is, they show higher activity (i.e., concentration) at the surface or interface than the bulk solution phase. Due to this property, they lower the surface tension of a liquid, the interfacial tension between two liquids, or that between a liquid and a solid. Surfactants may act as detergents, wetting agents, emulsifiers, foaming agents, and dispersants. Surfactants are organic compounds that are amphiphilic, meaning they contain both hydrophobic groups ("tails") and hydrophilic groups ("heads"). Therefore, a surfactant contains both an oil soluble component and a water soluble component.

As defined herein, an emulsifier is a type of surfactant that aids in forming of an emulsion (i.e., a mixture of two or more liquids that are normally immiscible) by decreasing the interfacial tension between immiscible liquids (e.g., oil and water), or a compound that stabilizes an already existing emulsion by decreasing the separation tendency of the liquids, or both.

As used herein, the term micelle includes any structure or aggregate that minimizes the contact between the hydrophobic ("solvent-repelling") portion of a surfactant molecule and the solvent, for example, by aggregating the surfactant molecules into structures such as spheres, cylinders, or sheets, wherein the hydrophobic portions are on the interior of the aggregate structure and the hydrophilic ("solvent-attracting") portions are on the exterior of the structure. For example, in a water phase, surfactants form micelles where the hydrophobic tails form the core of the micelle and the hydrophilic heads are in contact with the surrounding liquid. Such micelles are called normal-phase micelles (or oil-in-water micelles). In the case of inverse micelles (water-in-oil micelles), the head groups are located at the center, while the tails extend out, as it will be described later in greater detail.

According to the present embodiments, the wellbore fluids of the present disclosure, such as invert emulsions, may contain polymers which may increase the stability of the emulsion. Specifically, the wellbore fluids of the present disclosure may incorporate a polymer having a polycyclic backbone. Whereas the conventional polymer backbone has a single hydrocarbon chain forming the backbone, the polycyclic backbone of the present disclosure may be more complex, having the cyclic groups forming the "backbone". Such difference may be considered by equating the polycyclic backbone to a ladder and a conventional polymer backbone to a rope. Pendant groups may extend from the ladder. For example, the polycyclic backbone of the polymer is a copolymer of dicyclopentadiene (DCPD), where DCPD is a polymer composed of polymerized dicyclopentadiene. In such embodiments, the polycyclic backbone of the polymer has at least a dicyclopentadiene repeating unit.

In one or more embodiments, the polycyclic backbone of the polymer may be formed by the copolymerization reaction of DCPD and maleic anhydride at the terminal end of the polymer, with the formation of a copolymer DCPD/maleic anhydride as shown below by structure I. It is also envisioned that other derivatives of maleic anhydride may be used. The number of the DCPD repeating units, n, on the polycyclic backbone is selected in such a manner that the average molecular weight of the polymer ranges from about 200 to about 2000.

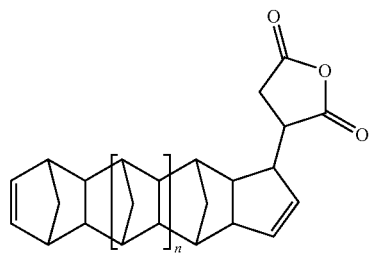

It is also envisioned that the polymers of the present disclosure are copolymers formed by the copolymerization reaction of at least two monomers, such as dicyclopentadiene and styrene. This is exemplified in structure II below. In such embodiments, the dicyclopentadiene is further derivatized with maleic anhydride, with the formation of a copolymer of dicyclopentadiene, styrene and maleic anhydride, where the DCPD is the repeating unit. As noted above, the number of the DCPD repeating units, n, is selected in such a manner that the molecular weight of the polymer ranges from about 200 to about 2000. However, other combinations are possible, depending on the desired degree of rigidity of the polycyclic backbone of the polymer. For example, the DCPD repeating units may alternate with styrene monomer units (not shown). It is also envisioned that the DCPD repeating units may alternate with other repeating units (not shown). In such embodiments, the molecular weight may be higher than 2000.

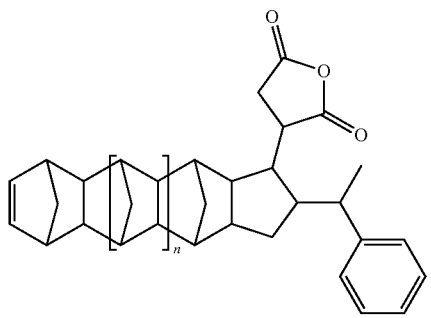

As seen above for structures I and II, the maleic anhydride is not functionalized. It is also envisioned that the maleic anhydride may be functionalized using various organic compounds. For example, the maleic anhydride may be functionalized in such a manner that the anhydride group has at least a hydrophilic group. As described later, the presence of the hydrophilic group may be desired for the stability of the invert micelles formed by the polymers of the present disclosure. The functionalization of the anhydride group as shown in structure II, above, may be performed with little effort because of the high reactivity of the intermediate anhydride. A few examples are shown below, in reactions III-VII. As noted below, R is the polymer having the polycyclic backbone, namely the poly DCPD, $R^1$—$NH_2$ is a primary amine, $R^1$—NH—$R^2$ is a secondary amine, $R^3$—OH is a primary, secondary or tertiary alcohol and $R^5(NH_2)_2$ is a polyfunctional amine, such as diethylenetriamine (DETA), TETA, DTPA, hexamethylene diamine and similar.

As the anhydride group acts as the head group of the surfactant polymer, as described later in greater detail, such modifications on the surfactant head group allow tailoring the structure of the polymer to give certain behaviors for any desired invert emulsion fluid, IEF.

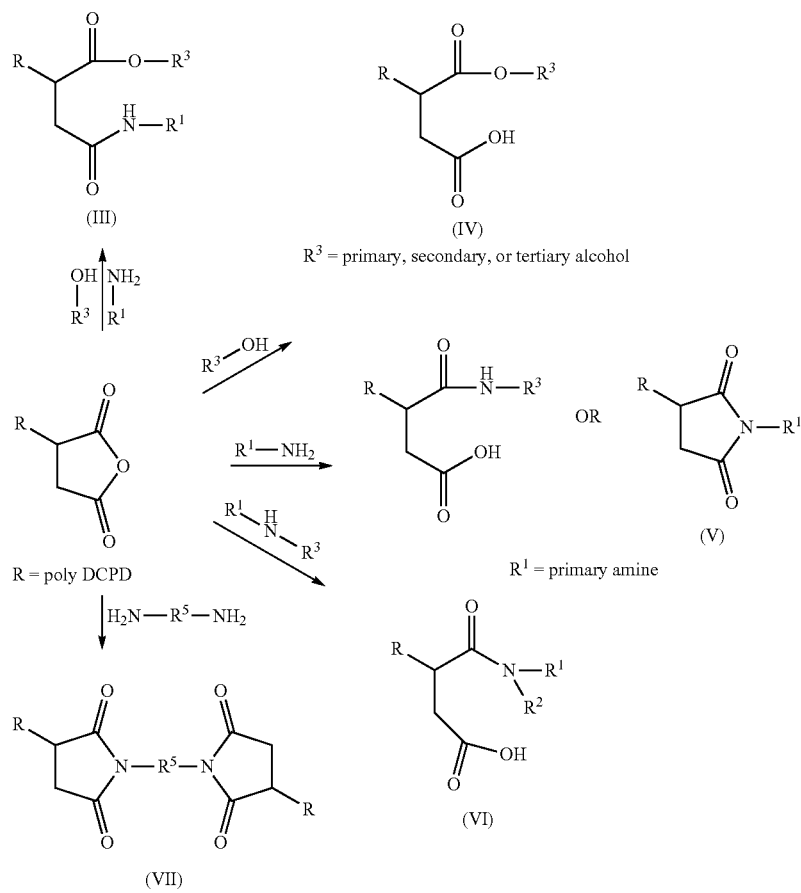

Without being bound by theory, it is believed that the polymers of the present disclosure may act as co-surfactants that may promote intermolecular interactions that enhance the invert emulsion fluid (IEF) mud stability. In such embodiments, the polymers of the present disclosure may be mixed with other surfactants that are capable of generating invert emulsions, such as amidoamines, fatty acids and ethoxylates. It is also envisioned that other surfactants may act as co-surfactants in the presence of the polymers of the present disclosure. According to various embodiments, a polymeric inverse micelle solution may be prepared by adding the polymers of the present disclosure to a mixture of the oleaginous continuous phase and the non-oleaginous discontinuous phase (such as for example brine and oil mixture), blending the polymers into the mixture, followed by shearing to enhance emulsion formation, where polymeric micelles are formed to provide a micelle solution. Depending on the functionality of the head group of the polymer, it is also envisioned that the polymers may be added into a non-oleaginous discontinuous phase, or may be added into an oleaginous continuous phase, prior to the formation of the emulsion. In one or more embodiments, the polymer as described herein may be used in excess. However, the amount of the emulsion used may be equal to or less than 25 ppb.

According to the present embodiments, the micelles formed by the emulsifiers of the present disclosure are inverse micelle-type assemblies or water-in-oil micelle (not shown), where the head hydrophilic groups are sequestered in the micelle core (such as an aqueous core) (not shown) and the hydrophobic tail groups (not shown) extend away from the center. Thus, the non-oleaginous phase, such as an aqueous phase (not shown), is an internal phase that is stably emulsified within the external oleaginous phase (not shown). According to various embodiments, the internal aqueous phase may range, for example, up to 60% of the volume of the emulsion, but may have a higher volume in high internal phase ratio invert emulsions.

As shown above in structures I and II, the hydrophobic tail can be bulky for space filling to better stabilize the invert micelle structure since the outer hydrophobic regime is bigger than the inner head (not shown). Compared to regular fatty acid tails in a conventional surfactant, the fused ring structure of DCPD polymer or other polycyclic polymer will occupy a bigger space to help stabilize the invert micelles.

Another feature of these fused ring polymer tails is their resistance to thermal breaking down. Generally, conventional unsaturated fatty acid derived surfactants have a few double bond carbon chain tails which are susceptible to oxidative breakings. However, breaking a chain in the DCPD or other polycyclic polymer implies breaking of multiple bonds, providing therefore more thermal stability. The link between the hydrophilic head and the hydrophobic tail is also accomplished through carbon-carbon bonds which are stronger than many polar bonding.

Another characteristic of the polymers having polycyclic backbone as described herein is their 3D structure. For example, FIG. 1 shows the 3D structure of polymer II presented above, where DPCD is derivatized with maleic anhydride. This material appears to be highly amorphous, meaning that polymers having polycyclic backbone based on a DCPD copolymer are unlikely to crystallize in oil based muds (OBM) and cause unreasonably high low temperature rheology. Furthermore, the lack of crystallization is an indication that the DCPD polycyclic backbone may exhibit increased solubility in a base oil at low temperatures compared to polymers having simple backbones, for example, polyethylene or polypropylene backbones. Additionally, the rigid ladder structure of the polymer as described herein may provide improved steric stabilization for emulsion droplets compared to a more flexible backbone of an emulsifier (an example of a typical emulsifier is represented by fatty acid soaps).

The synthesis of the polymers of the present disclosure is versatile as the chain length of the polycyclic backbone of the polymer may be controlled through polymerization. In addition, the maleic anhydride content may be modified to give different HLB ratios. As described herein, the term "HLB" (Hydrophilic Lipophilic Balance) refers to the ratio of the hydrophilicity of the polar groups of the surface-active molecules to the hydrophobicity of the lipophilic part of the same molecules. One skilled in the art would appreciate that an HLB value may be calculated by considering the molecular weight contributions of the respective hydrophilic and lipophilic portions and taking the ratio thereof (divided by 5). Generally, the Bancroft rule applies to the behavior of emulsions: emulsifiers and emulsifying particles tend to promote dispersion of the phase in which they do not dissolve very well; for example, a compound that dissolves better in water than in oil tends to form oil-in-water emulsions (that is, they promote the dispersion of oil droplets throughout a continuous phase of water). Emulsifiers are typically amphiphilic. That is, they possess, as noted above, both a hydrophilic portion and a hydrophobic portion. The chemistry and strength of the hydrophilic polar group compared with those of the lipophilic nonpolar group determine whether the emulsion forms as an oil-in-water or water-in-oil emulsion. In particular, emulsifiers may be evaluated based on their HLB value. Generally, to form a water-in-oil emulsion, an emulsifier (or a mixture of emulsifiers) having a low HLB, such as between 3 and 8, may be desirable. In a particular embodiment, the HLB value of the emulsifier may range from 4 to 6.

It is also envisioned that tailoring the structure of the polymers of the present disclosure may allow for other applications, depending on the rigidity, as well as functionality of the polycyclic backbone. Polymers as described herein may be added to a continuous phase regardless of composition. However, the presence of a hydrophobic group does not guarantee compatibility or solubility with the continuous phase. Furthermore, the conductivity of the polymer may be modified from non-conductive to conductive or vice versa, depending on the structure of the polymer.

The base fluids described herein may be oil-based wellbore fluids, such as an invert emulsion where a non-oleaginous phase is emulsified within an oleaginous continuous phase. In one or more embodiments, the oleaginous continuous phase is selected from the group including diesel oil, mineral oil, a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids. Generally, the amount of the oleaginous phase may be sufficient to form a stable emulsion when utilized as the continuous phase. The amount of oleaginous phase in the invert emulsion fluid may vary depending upon the particular oleaginous phase used, the particular non-oleaginous phase used, and the particular application in which the invert emulsion fluid is to be employed. The amount of non-oleaginous phase in the invert emulsion fluid may vary depending upon the particular non-oleaginous phase used, the emulsifier selected to stabilize the non-oleaginous phase, and the particular application in which the invert emulsion fluid is to be employed. In one or more embodiments, the oil based fluid may contain up to 40, 50 or 60 vol. % water or other non-oleaginous phase, and at least 40, 50, or 60 vol. % of oleaginous phase.

As mentioned above, the wellbore fluid may be an invert emulsion having a continuous oleaginous phase and a discontinuous non-oleaginous liquid phase, among other substances and additives. Non-oleaginous liquids may, in some embodiments, include at least one of fresh water, sea water, brine, mixtures of water and water-soluble organic compounds, and mixtures thereof. In various embodiments, the non-oleaginous phase may be a brine, which may include seawater, aqueous solutions wherein the salt concentration is less than that of sea water, or aqueous solutions wherein the salt concentration is greater than that of sea water. As described later in greater detail, the seawater contains more than one dissolved salt. Therefore, the salinity is expressed as the total dissolved solids (TDS). It is also envisioned that synthetic brines may be used in the wellbore fluids disclosed herein, the synthetic brines tending to be much simpler in constitution than the natural ones.

Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution.

The amount of the non-oleaginous fluid is typically less than the theoretical limit needed for forming an invert emulsion. Thus, in one embodiment, the amount of non-oleaginous fluid is at least 40% by volume, or from about 40% to about 60% by volume of the invert emulsion fluid.

Upon mixing, the fluids of the present embodiments may be used in wellbore operations, such as drilling operations. Such operations are known to persons skilled in the art and involve pumping a drilling fluid into a wellbore through an earthen formation. The wellbore fluids of the present embodiments may have particular applications for drilling operations at high temperatures as they exhibit improved emulsion stability. In addition, such IEF muds are stable, while maintaining a favorable environmental rating.

One embodiment of the present disclosure includes a method that involves a method of drilling. In such an illustrative embodiment, the method involves pumping a wellbore fluid into a wellbore through an earthen formation, the wellbore fluid including an oleaginous continuous phase, a non-oleaginous discontinuous phase and the polymer having a polycyclic backbone as described above. In such embodiment, the amount of polymer used as emulsifier ranges from about 3 pounds per barrel to about 25 pounds per barrel, where the lower limit can be any of 3 pounds per barrel, 4 pounds per barrel or 5 pounds per barrel and the upper limit can be any of 10 pounds per barrel, 15 pounds per barrel or 25 pounds per barrel, where any lower limit can be used with any upper limit.

Examples

The following examples are presented to further illustrate the emulsifying ability of the polymeric surfactants as described herein.

Emulsion and Temperature Stability

To investigate the stability of the brine-in-oil emulsions created by the polymers (or resins) as described herein, a simple brine/oil mixture was prepared. The brine used was a 25% by weight solution of calcium chloride in water. 28 vol % of this calcium chloride brine was stirred into a synthetic base oil (a C15-C18 olefin blend) using an overhead lab mixer at approximately 3000 rpm. A small amount of calcium hydroxide (lime) was added to generate the carboxylate from acid or anhydride—the actual emulsifier from the test resin. The test solid resin, was crushed into a fine grained powder before adding to the mixture; an amount of 4 grams for every 350 ml liquid mixture was used. After blending the resin into the brine/oil mixture, the mixture was sheared on a Silverson mixer at 6000 rpm for 5 minutes to micronize the brine droplets and enhance emulsion formation. The stability of these emulsions was determined visually. Afterwards, the mixture was divided evenly into three portions and placed into aging cells. The mixtures were aged with rolling for 6 to 16 hours at 250° F. (121° C.), 350° F. (177° C.), or 400° F. (204° C.). After cooling to ambient temperature, the mixtures were removed from the aging cells and the emulsions inspected.

As observed experimentally, many of these combinations remained in emulsified form (not shown), even after aging at elevated temperatures, and settled slowly after standing quiescent over several hours, with no appearance of an aqueous layer at the bottom (brine is heavier). One of the settled phases had a smooth to fine-grained appearance. The lack of a visible aqueous phase is an indication of the strong emulsifying ability of these resins.

Table 1 below summarizes the visual characterization of emulsions prepared using 10 different DCPD based polymers, namely Resin 1-Resin 10. As can be seen from Table 1, many of these emulsions remain stable after 350° F. (177° C.) hot roll, one of the emulsions is even stable after 400° F. (204° C.) hot roll. These results indicate that the DCPD copolymer has excellent emulsifier ability at high temperatures.

Figure 2:
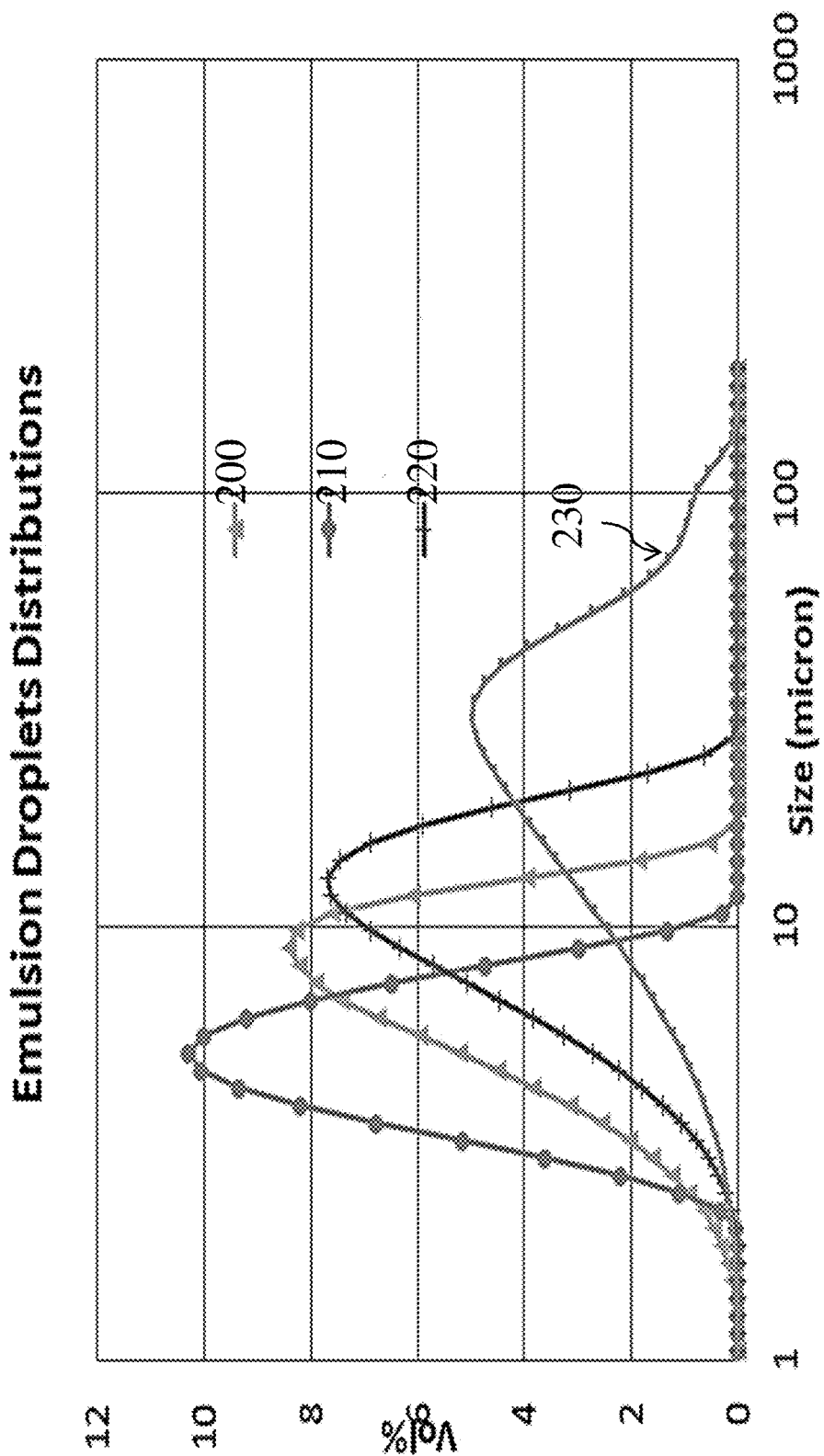
FIGS. 2 and 3 show emulsion droplets distributions according to embodiments of the present disclosure.
Figure 3:
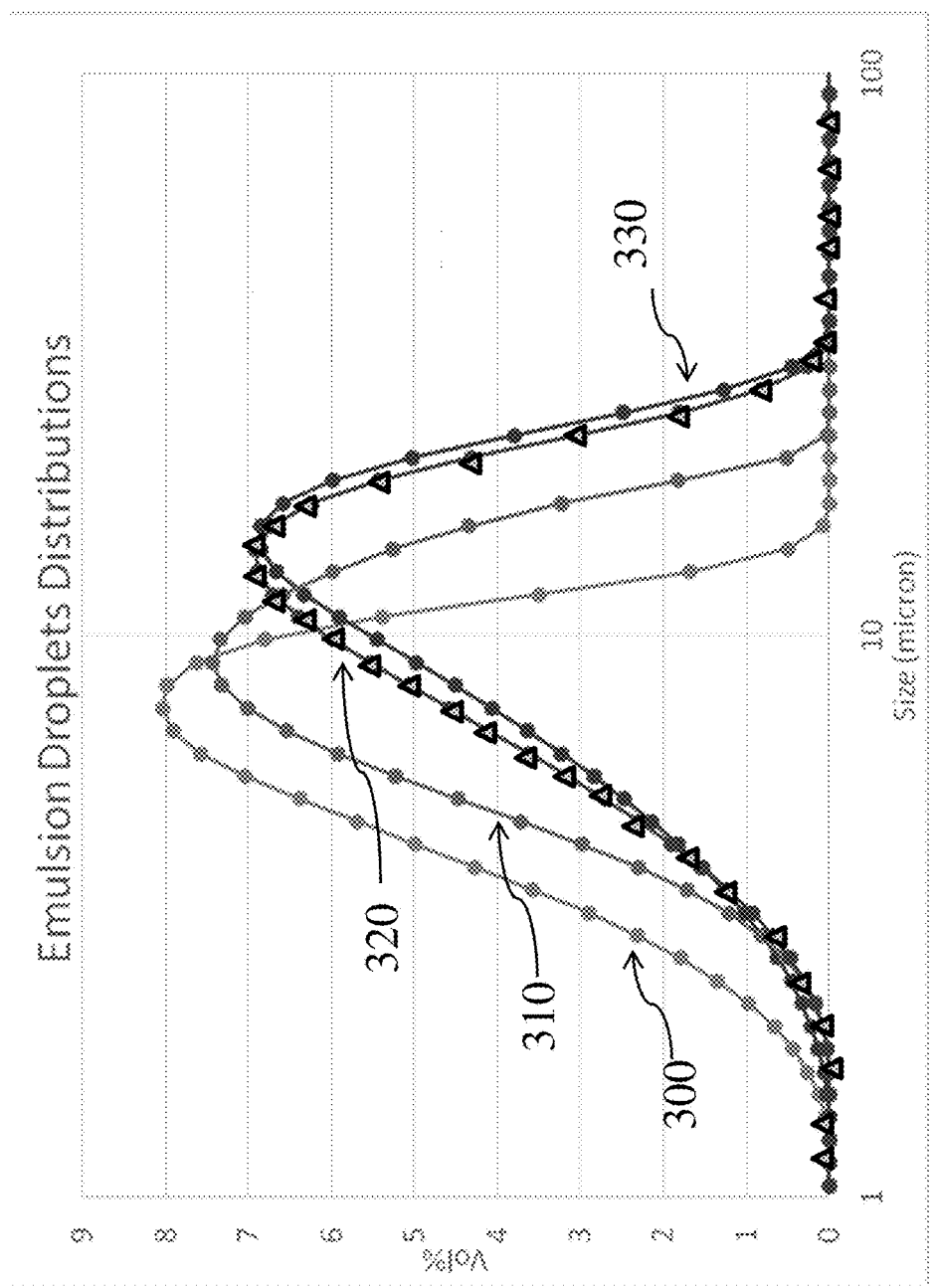

To further demonstrate the emulsion stability, several emulsion samples were selected to study the particle size distribution (PSD). Examples are shown in FIGS. 2 and 3. Referring now to FIG. 2, 200 represents Resin 9 not hot rolled, 210 represents Resin 9 hot rolled at 250° F. (121° C.), 220 represents Resin 9 hot rolled at 350° F. (177° C.) and 230 represents Resin 9 hot rolled at 400° F. (204° C.). Referring now to FIG. 3, 300 represents Resin 3 not hot rolled, 310 represents Resin 3 hot rolled at 250° F. (121° C.), 320 represents Resin 3 hot rolled at 350° F. (177° C.) and 330 represents Resin 3 hot rolled at 400° F. (204° C.). These results corroborate with the visual observation that Resin 3 emulsion is stable even after 400° F. (204° C.) hot roll.

Mud Formulation and Performances

Two examples of mud formulations are shown below in Table 2 with different emulsifier loadings. The emulsifier that was used in the system was Resin 3, a polycyclic DCPD resin having maleic grafts and a MW of 773. Though additional functionalization hasn't been tried, it is envisioned that functionalization with amines or esters, similar to reactions III-VII, as described above, may be possible. Typical properties exhibited by various polycyclic DCPD resins are shown below in Table 3. VERSAGEL HT® (pure hectorite clay) is a viscosifier, SUREWET® is an additive that may function as a secondary emulsifier, ECOTROL HT® is a filtration-control synthetic co-polymer and M-I WATE® is a high-quality, drilling-grade barite (barium sulfate) used to increase the density of drilling fluids, all available from M-I SWACO, Houston, Tex.

TABLE 2

15 ppg Oil Based Mud 80-20 oil-brine ratio, hot rolled at 250° F.

| Formulation | | |
|---|---|---|
| Synthetic B | 152 | 152 |
| VERSAGEL HT ®, g | 2 | 2 |
| Lime, g | 5 | 5 |
| Emulsifier, g | 20 | 12.5 |
| SUREWET ®, g | 1 | 1 |
| ECOTROL HT ®, g | 3 | 3 |

TABLE 1

Visual characterization of various emulsions

| | Resin 1 | Resin 2 | Resin 3 | Resin 4 | Resin 5 | Resin 6 | Resin 7 | Resin 8 | Resin 9 | Resin 10 |
|---|---|---|---|---|---|---|---|---|---|---|
| Mn | 353 | 364 | 390 | 613 | 588 | 587 | 900 | 914 | 943 | 489 |
| Acid number (mg KOH/g) | 5.1 | 13.9 | 22.5 | 23.1 | 14.6 | 5.3 | 5.5 | 14.8 | 23.7 | 44 |
| Observations after hot rolled at 250° F. | granular solids, quickly settled, no water | fine solids, slowly settled, no water | fine solids, slowly settled, no water | slightly grainy solids, moderate settling, no water | slightly grainy solids, moderate settling, no water | hard rapid settling, large chunks, no water | slightly grainy, moderate settling, no water | fine solids, moderate settling, no water | fine solids, slow settling, no water | fine solids, rapid settling, no water |
| Observations after hot rolled at 350° F. | grainy solids, rapid settling, no water | slightly grainy, moderate settling, no water | slightly grainy, moderate settling, no water | slightly grainy, rapid settling, no water | slightly grainy, moderate settling, no water | chunks and granules, rapid settling, no water | fine solids, rapid settling, no water | grainy, rapid settling, no water | fine solids, moderate settling, no water | dark color, emulsion broke, water layer |
| Observations after hot rolled at 400° F. | emulsion broke, water layer | grainy, rapid settling, no water | slightly grainy, moderate settling, no water | large chunks, rapid settling, no water | chunky, rapid settling, no water | emulsion broke, water layer | emulsion broke, water layer | grainy, rapid settling, no water | big chunks, waxy, rapid settling, no water | skipped because unstable at 350° F. |

TABLE 2-continued 15 ppg Oil Based Mud 80-20 oil-brine ratio, hot rolled at 250° F.

| Formulation | | |
|---|---|---|
| 25% CaCl$_2$ brine, g | 65 | 65 |
| M-I WATE ®, g | 410 | 410 |

TABLE 3

Typical properties of polycyclic resins that can be used as OBM emulsifiers.

| | Resin 1 | Resin 2 | Resin 3 | Resin 6 | Resin 5 | Resin 4 | Resin 7 | Resin 8 | Resin 9 |
|---|---|---|---|---|---|---|---|---|---|
| Mn | 353 | 364 | 390 | 587 | 588 | 613 | 900 | 914 | 943 |
| Mw | 626 | 682 | 773 | 1316 | 1320 | 1406 | 2173 | 2204 | 2343 |
| Polydispersity | 1.77 | 1.87 | 1.98 | 2.24 | 2.25 | 2.29 | 2.41 | 2.41 | 2.48 |
| Acid number (mg KOH/g) | 5.1 | 13.9 | 22.5 | 5.3 | 14.6 | 23.1 | 5.5 | 14.8 | 23.7 |
| Softening Point, R&B (° C.)* | 95 | 100 | 111 | 145 | 148 | 156 | 98 | 103 | 111 |
| Gardner Color (50% in solvent) | 8 | 8.2 | 8.8 | 11.7 | 11.5 | 11.6 | 10.4 | 10.1 | 11.3 |
| Typical Specific Gravity @ 25° C. | 1.1 | 1.1 | 1.1 | 1.08 | 1.08 | 1.08 | 1.06 | 1.06 | 1.06 |
| Viscosity (cps) | | | | | | | | | |
| 140° C. | 1700 | 3320 | 11500 | — | — | — | 9400 | 15900 | 36100 |
| 160° C. | 383 | 650 | 1660 | — | — | — | 2110 | 3150 | 3150 |
| 180° C. | 55 | 195 | 407 | 13700 | 18500 | 48000 | 347 | 622 | 622 |
| 200° C. | — | — | — | 2450 | 3040 | 6250 | — | — | — |
| 220° C. | — | — | — | 657 | 745 | 1320 | — | — | — |

The properties of the mud formulated as shown in Table 2 were evaluated using a conventional approach for mud properties analysis. The properties of the mud after heat stress were evaluated by studying the rheology of the mud using a FANN 35 viscometer. The measurements were performed after mud preparation and after mud aging at 250° F. (121° C.) in a roller oven. The results are shown in Table 4.

TABLE 4

Rheology and HPHT properties of mud using the formulation as shown in Table 2.

| | 20 ppb resin | | | 12.5 ppb resin | | |
|---|---|---|---|---|---|---|
| | 150° F. (65° C.) before hot roll | 100° F. (38° C.) after hot roll | 150° F. (65° C.) after hot roll | 150° F. (65° C.) before hot roll | 100° F. (38° C.) after hot roll | 150° F. (65° C.) after hot roll |
| 600 rpm | 90 | 238 | 112 | 75 | 188 | 83 |
| 300 rpm | 54 | 153 | 74 | 44 | 120 | 49 |
| 200 rpm | 41 | 121 | 59 | 34 | 94 | 37 |
| 100 rpm | 27 | 85 | 44 | 22 | 65 | 24 |
| 6 rpm | 9 | 46 | 30 | 6 | 30 | 11 |
| 3 rpm | 8 | 46 | 30 | 6 | 28 | 11 |
| PV | 36 | 85 | 38 | 31 | 68 | 34 |
| YP | 18 | 68 | 36 | 13 | 52 | 15 |
| 10" Gels | 12 | 45 | 31 | 7 | 28 | 9 |
| 10' Gels | 37 | 79 | 50 | 35 | 50 | 28 |
| ES | 1542 | | 1394 | 894 | | 804 |
| HTHP fluid loss at 250° F. (121° C.) | | 3.6 | | | 3.6 | |
| Water | | 0 | | | 0 | |
| HTHP fluid loss at 350° F. (176° C.) | | 4.8 | | | | |
| Water | | 0 | | | | |

As seen in Table 4, above, ES refers to the electrical stability of the emulsion. As noted above, the wellbore fluids of the present disclosure possess an aqueous phase that is stably emulsified within the external oleaginous phase. Upon application of an electric field to an invert emulsion fluid, the emulsified non-oleaginous phase, which possesses charge, will migrate to one of the electrodes used to generate the electric field. The incorporation of emulsifiers as described herein in the invert emulsion fluid stabilizes the emulsion and results in a slowing of the migration rate and/or increased voltage for breakage of the emulsion. Thus, an electrical stability (ES) test, specified by the American Petroleum Institute at API Recommended Practice 13B-2, Third Edition (February 1998), is often used to determine the stability of the emulsion. ES is determined by applying a voltage-ramped, sinusoidal electrical signal across a probe (consisting of a pair of parallel flat-plate electrodes) immersed in the mud. The resulting current remains low until a threshold voltage is reached, whereupon the current rises very rapidly. This threshold voltage is referred to as the ES ("the API ES") of the mud and is defined as the voltage in peak volts-measured when the current reaches 61 μA. The test is performed by inserting the ES probe into a cup of 120° F. (48.9° C.) mud applying an increasing voltage (from 0 to 2000 volts) across an electrode gap in the probe. The higher the ES voltage measured for the fluid, the stronger or harder to break would be the emulsion created with the fluid, and the more stable the emulsion is.

In addition to 250° F. HPHT fluid loss, performed at same temperature as aging, a higher temperature HPHT was performed to demonstrate that Resin 3 is capable of stabilizing emulsion efficiently. The result for HPHT at 350° F. (177° C.) indicates that no water is present in the filtrate, which is an indication of a strong emulsion. Additionally, the FANN 35 readings shown in Table 4 indicate that the rheology may be controlled by changing the amount of Resin 3 loaded into the formulation.

Formulations presented below in Table 5 are examples of OBM that were prepared and then heat aged at 350° F. (177° C.). These examples include two formulations at different resin loadings. In this example, fluid was aged at 350° F. (177° C.) after preparation. The experiment performed at 350° F. (177° C.) is an example of severe conditions that can be found in certain drilling operations. The objective of this experiment is to demonstrate that fluid based on Resin 3 is capable of functioning under such demanding conditions.

TABLE 5

15 ppg mud at 80-20 oil-brine ratio hot rolled at 350° F.

|  | 12.5 ppb resin | 8 ppb resin |
|---|---|---|
| Synthetic B | 152 | 152 |
| VERSAGEL HT ®, g | 2 | 2 |
| Lime, g | 5 | 5 |
| Emulsifier, g | 12.5 | 8 |
| SUREWET ®, g | 1 | 1 |
| Fluid loss additive (FLA), g | 3 | 3 |
| 25% CaCl₂ brine | 65 | 65 |
| M-I WATE | 410 | 410 |

TABLE 6

Rheology and HPHT data for 15 ppg mud at 80-20 oil-brine ratio hot rolled at 350° F. (176° C.)

|  | 12.5 ppb resin | | | 8 ppb resin | | |
|---|---|---|---|---|---|---|
|  | 150° F. (65° C.) before hot roll | 100° F. (38° C.) after hot roll | 150° F. (65° C.) after hot roll | 150° F. (65° C.) before hot roll | 100° F. (38° C.) after hot roll | 150° F. (65° C.) after hot roll |
| 600 rpm | 75 | 300 | 271 | 86 | 257 | 158 |
| 300 rpm | 44 | 240 | 211 | 56 | 183 | 118 |
| 200 rpm | 34 | 219 | 179 | 44 | 152 | 103 |
| 100 rpm | 22 | 187 | 131 | 31 | 116 | 74 |
| 6 rpm | 6 | 131 | 55 | 17 | 61 | 26 |
| 3 rpm | 6 | 81 | 43 | 16 | 48 | 20 |
| PV | 31 | 60 | 60 | 30 | 74 | 40 |
| YP | 13 | 180 | 151 | 26 | 109 | 78 |
| 10" Gels | 7 | 89 | 48 | 16 | 50 | 22 |
| 10' Gels | 35 | >300 | 57 | 36 | 45 | 33 |
| ES | 894 |  | 1023 | 890 |  | 864 |
| HTHP fluid loss at 350° F. (176° C.) |  | 7.8 |  |  |  | 13 |
| Water |  | <0.1 |  |  |  | 0.1 |

Data presented in Table 6 illustrates that fluid prepared with Resin 3 may withstand a temperature of 350° F. (176° C.) while still maintaining adequate properties, including emulsion strength as shown by the ES and HPHT values. As seen from Table 6, the rheology of the mud with the 12.5 ppb resin loading is too high. However, the rheology of the mud may be adjusted by reducing the resin loading.

To further expand the scope and application of polycyclic DCPD resins, a 13 ppg fluid was prepared using a 75-25 oil-brine ratio. To establish a structure-activity relationship between different products, two different polycyclic resins were used, namely Resin 3 and Resin 9. Formulations are shown below in Table 7. The fluids were aged at 250° F. (121° C.) and the rheological properties were measured. Results are shown below in Table 8.

TABLE 7

13 ppg 75-25 oil-brine ratio using two different resins

|  | Product | |
|---|---|---|
|  | Resin 9 ECOTROL HT ® | Resin 3 ECOTROL HT ® |
| Synthetic B | 157 | 157 |
| VERSAGEL HT ®, g | 2 | 2 |
| Lime, g | 5 | 5 |
| Emulsifier, g | 8 | 8 |
| SUREWET ®, g | 1 | 1 |
| FLA, g | 3 | 3 |
| 25% CaCl₂ brine, g | 89 | 89 |
| M-I WATE ®, g | 294 | 294 |

TABLE 8

Rheology and HPHT results for 13 ppg 75-25 oil-brine ratio using two different resins.

|  | Resin 9 | | | Resin 3 | | |
|---|---|---|---|---|---|---|
|  | 150° F. (65° C.) before hot roll | 100° F. (38° C.) after hot roll | 150° F. (65° C.) after hot roll | 150° F. (65° C.) before hot roll | 100° F. (38° C.) after hot roll | 150° F. (65° C.) after hot roll |
| 600 rpm | 46 | 75 | 48 | 63 | 90 | 55 |
| 300 rpm | 23 | 41 | 22 | 34 | 48 | 29 |
| 200 rpm | 17 | 30 | 15 | 26 | 34 | 20 |
| 100 rpm | 9 | 18 | 8 | 17 | 19 | 12 |
| 6 rpm | 2 | 3 | 1 | 6 | 2 | 3 |
| 3 rpm | 2 | 2 | 1 | 6 | 2 | 3 |
| PV | 23 | 34 | 26 | 29 | 42 | 26 |
| YP | 0 | 7 | −4 | 5 | 6 | 3 |
| 10" Gels | 2 | 2 | 1 | 6 | 2 | 3 |
| 10' Gels | 6 | 5 | 2 | 25 | 9 | 11 |
| ES | 324 |  | 203 | 292 |  | 309 |
| HTHP fluid loss at 250° F. (121° C.) |  | 1.3 |  |  |  | 3 |
| Water |  | 0 |  |  |  | trace |

With regard to Table 8, it is particularly worth noting the difference in gel strengths. Without being bound by theory, the inventors of the present disclosure believe that the difference in the gel strengths may be attributed to different molecular weights and HLB ratios of the two polycyclic DCPD resins. Specifically, both resins have comparable acid numbers, but large difference in MW (2343 vs. 773). The data presented in Table 8 illustrates the effect of molecular weight of the resin on the rheological properties.

Furthermore, increased sag of solids was observed during rheology measurements performed for the fluid containing Resin 9 versus the fluid containing Resin 3. Solids sag is an undesirable property and should be minimized. It was observed that selection of proper polycyclic DCPD resin may help minimizing solids sag.

An additional example illustrating the utility of polycyclic resins as emulsifiers in an OBM is demonstrated using the formulation shown below in Table 9. In this example, a fluid having 40% internal phase was prepared. The main advantage of such a fluid is a decreased cost compared to a fluid that uses less internal phase.

TABLE 9

13 ppg 60-40 oil-brine ratio OBM using Resin 3.

| Synthetic B | 125 |
|---|---|
| VERSAGEL HT ®, g | 2 |
| Lime, g | 5 |

TABLE 9-continued 13 ppg 60-40 oil-brine ratio OBM using Resin 3.

| | |
|---|---|
| Emulsifier, g | 8 |
| SUREWET ®, g | 1 |
| FLA, g | 3 |
| 25% CaCl$_2$ brine, g | 142 |
| M-I WATE ®, g | 265 |

Table 10, below, illustrates the data obtained after the fluid was aged at 250° F. (121° C.). These results show that Resin 3 is capable of stabilizing an OBM even at high internal phase ratio.

TABLE 10

Rheology and HPHT results for 13 ppg 60-40 oil-brine ratio OBM using Resin 3

| | Resin 3 | | |
|---|---|---|---|
| | 150° F. (65° C.) | 100° F. (38° C.) | 150° F. (65° C.) |
| 600 rpm | 160 | 224 | 120 |
| 300 rpm | 102 | 136 | 70 |
| 200 rpm | 80 | 102 | 51 |
| 100 rpm | 57 | 63 | 31 |
| 6 rpm | 35 | 12 | 9 |
| 3 rpm | 33 | 10 | 9 |
| PV | 58 | 88 | 50 |
| YP | 44 | 48 | 20 |
| 10" Gels | 38 | 10 | 8 |
| 10' Gels | 48 | 29 | 29 |
| ES | 154 | | 232 |
| HTHP at 250° F. (121° C.) | | | 1.8 |
| Water | | | 0.05 |

Advantageously, embodiments of the present disclosure may provide wellbore fluids and methods of using such fluids that include an oleaginous continuous phase, a non-oleaginous discontinuous phase and a polymer having a polycyclic backbone. The use of a polycyclic backbone based on a DCPD copolymer and its derivatives in the wellbore fluids of the present disclosure advantageously promotes intermolecular interactions that may enhance IEF mud stability at high temperature. As described above, the DCPD copolymer may provide a portfolio of new emulsifiers with beneficial features. In addition, modifications on the surfactant head group of the polymer may allow for tailoring the molecule in such a manner to give specific behaviors for any desired IEF.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of drilling, comprising:
    pumping a wellbore fluid into a wellbore through an earthen formation, the wellbore fluid comprising:
        an oleaginous continuous phase;
        a non-oleaginous discontinuous phase formed as emulsion droplets; and
        a polymer having a polycyclic backbone,
    wherein
        a particle size distribution of a majority of the emulsion droplets is less than 100 microns,
        a peak of the particle size distribution of the majority of the emulsion droplets is greater than 1 micron and less than 10 microns,
        a first portion of the emulsion droplets having first particle sizes of less than 10 microns, and
        a second portion of the emulsion droplets have second particle sizes of greater than 10 microns and less than 100 microns.

2. The method of claim 1, wherein the polycyclic backbone of the polymer has at least a dicyclopentadiene repeating unit.

3. The method of claim 2, wherein the polymer having a polycyclic backbone further contains at least a styrene monomer unit.

4. The method of claim 2, wherein the dicyclopentadiene repeating unit is derivatized with maleic anhydride.

5. The method of claim 4, wherein the maleic anhydride is not functionalized.

6. The method of claim 4, wherein the maleic anhydride has a functionalized anhydride group.

7. The method of claim 6, wherein the functionalized anhydride group of the maleic anhydride has at least a hydrophilic group.

8. The method of claim 7, wherein the functionalized anhydride group is functionalized with an alcohol, an amine, or combinations thereof.

9. The method of claim 8, wherein the alcohol is selected from the group consisting of primary, secondary and tertiary alcohols.

10. The method of claim 8, wherein the amine is selected from the group consisting of primary, secondary and polyfunctional amines.

11. The method of claim 1, wherein the polymer is used in an amount ranging from 3 to 25 pounds per barrel.

12. A method of drilling, comprising:
    pumping a wellbore fluid into a wellbore through an earthen formation, the wellbore fluid comprising:
        an oleaginous continuous phase;
        a non-oleaginous discontinuous phase formed as emulsion droplets; and
        a polymer having a polycyclic backbone and a polydispersity ranging from 1.77 to 2.48,
    wherein
        a particle size distribution of a majority of the emulsion droplets is less than 100 microns
        a first portion of the emulsion droplets having first particle sizes of less than 10 microns, and
        a second portion of the emulsion droplets have second particle sizes of greater than 10 microns and less than 100 microns.

13. The method of claim 1, wherein an amount of the non-oleaginous discontinuous phase is at least 40% by volume of the wellbore fluid.

14. The method of claim 13, wherein the amount of the non-oleaginous discontinuous phase is from about 40% to about 60% by volume of the wellbore fluid.

* * * * *